United States Patent [19]
Snyder et al.

[11] Patent Number: 6,030,058
[45] Date of Patent: Feb. 29, 2000

[54] MOBILE CONSTRUCTION VEHICLE DRIVEN BY TRACK ASSEMBLIES USING CONTINUOUS ELASTOMERIC BELTS

[75] Inventors: Craig L. Snyder, Glen Gardner, N.J.; Thomas A. Roth, Lerna, Ill.; Thomas Thomason; Randy Webb, both of Charleston, Ill.; Jerry F. Rau, Richardson, Tex.

[73] Assignee: Blaw-Knox Construction Equipment Corporation, Mattoon, Ill.

[21] Appl. No.: 09/053,757

[22] Filed: Apr. 2, 1998

[51] Int. Cl.[7] ................................................. B62D 55/00
[52] U.S. Cl. ............................................. 305/199; 305/115
[58] Field of Search ..................................... 305/100, 115, 305/193, 195, 199

[56] References Cited

U.S. PATENT DOCUMENTS

| | | | |
|---|---|---|---|
| 1,316,951 | 9/1919 | Henderson | 305/7 |
| 4,244,588 | 1/1981 | Langewisch | 305/100 |
| 4,253,674 | 3/1981 | Fee | 305/100 |
| 4,553,760 | 11/1985 | Reed et al. | 305/100 |
| 4,781,257 | 11/1988 | Gee et al. | 305/100 |
| 5,131,731 | 7/1992 | Johnson | 305/193 |
| 5,161,867 | 11/1992 | Johnson | 305/199 |
| 5,190,363 | 3/1993 | Brittain et al. | 305/199 |
| 5,352,029 | 10/1994 | Nagorcka | 305/115 |
| 5,769,512 | 6/1998 | Kautsch | 305/115 |
| 5,899,541 | 5/1999 | Ying et al. | 305/115 |

*Primary Examiner*—D. Glenn Dayoan
*Assistant Examiner*—Long Bao Nguyen
*Attorney, Agent, or Firm*—John J. Selko; Mark A. Ussai

[57] ABSTRACT

A paving machine is driven by track assemblies utilizing continuous rubber belts driven by drive wheels. Each drive wheel is driven by a planetary gear assembly. Each drive wheel is formed from a pair of annular ring members rigidly connected together and spaced apart to provide a passage for directing debris falling from a rotating drive wheel away from the planetary gear, to minimize damage to the planetary gear assembly.

2 Claims, 8 Drawing Sheets

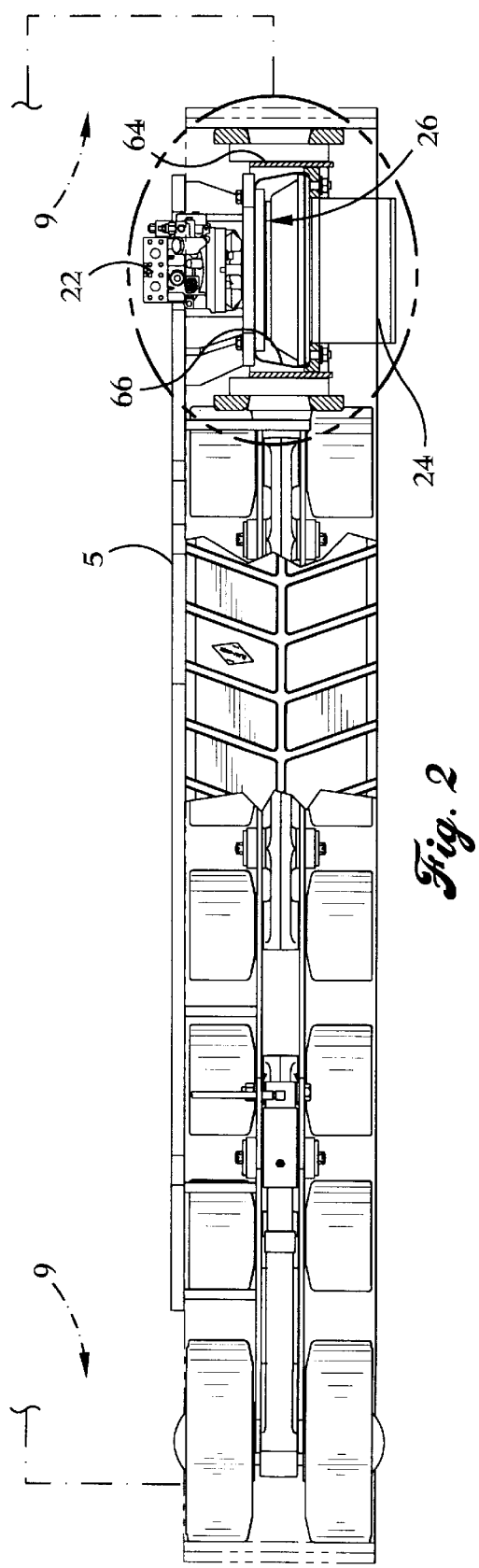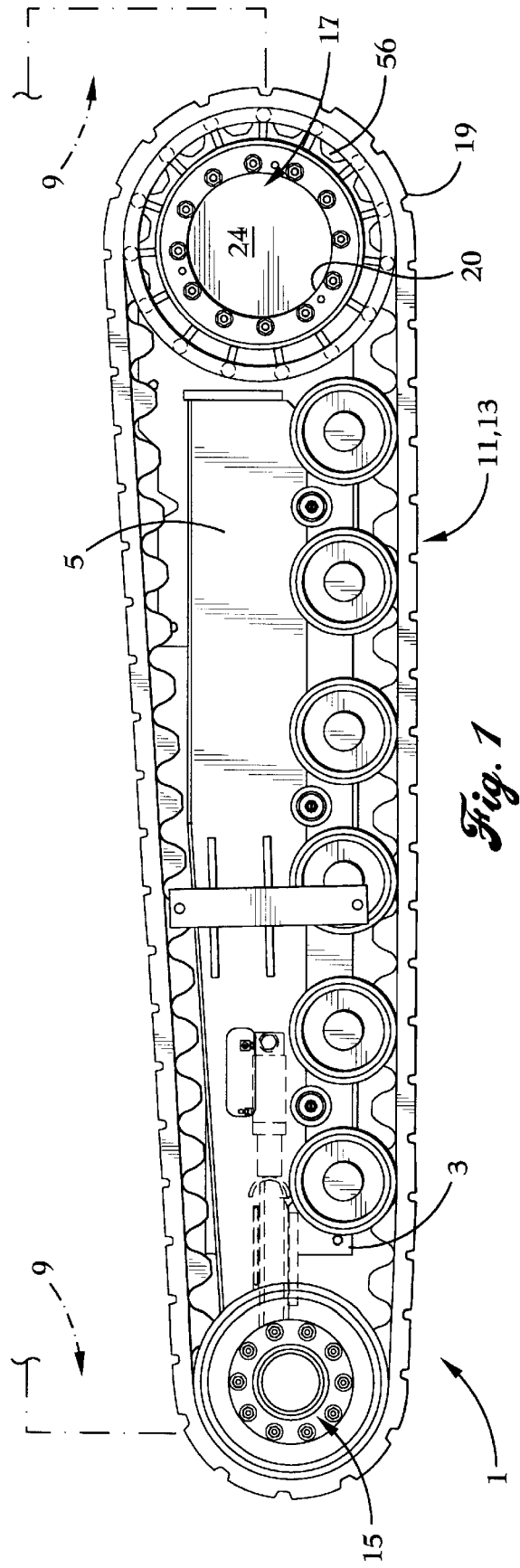

MOBILE CONSTRUCTION VEHICLE DRIVEN BY TRACK ASSEMBLIES USING CONTINUOUS ELASTOMERIC BELTS

BACKGROUND OF THE INVENTION

This invention relates generally to mobile construction vehicles and more particularly to paving machines that are driven by track assemblies utilizing continuous rubber belts.

One type of such machines uses a motor and planetary gear reduction combination on each drive wheel to drive the belt. One problem with prior art devices is that the planetary gear requires a planetary joint connection between a rotating and a non-rotating portion. This planetary joint must contain an elastomeric seal to retain lubricating fluid in the planetary housing. Debris from a rotating drive wheel falls into the planetary joint, damaging the seal and leading to loss of lubricant fluid.

Another problem with prior art devices is that during a turning maneuver, the drive wheel lugs frequently "walk up" the sidewalls of the teeth of a drive belt, to disengage the belt from the drive wheel. Obviously, this is a serious event.

The foregoing illustrates limitations known to exist in present belt-driven pavers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an improved drive wheel for a mobile construction vehicle utilizing track assemblies and continuous toothed drive belts comprising: a first annular ring member having a tubular body circumscribing a central axis; a second annular ring member positioned concentrically with respect to the central axis around the first annular ring member, the second ring member spaced radially outwardly from the first ring member with respect to the central axis, the second ring member comprising: a pair of parallel, spaced-apart annular side disc members, each side disc member having an outwardly oriented circumferential surface for contacting a continuous drive belt; a plurality of drive wheel lugs extending between the side disc members, the wheel drive lugs extending parallel to the central axis, the drive wheel lugs rigidly connecting the first and second annular ring members, the drive wheel lugs spaced circumferentially from each other around the side discs, the drive wheel lugs forming a plurality of sprocket openings, each sprocket opening adapted for receiving and advancing an individual tooth of a continuous drive belt, when the drive wheel rotates in a track assembly; the first and second annular ring members being spaced from each other to provide a passage for debris falling from from a rotating drive wheel to move away from the continuous belt, via the sprocket openings and along the first annular ring member; and means for fastening the drive wheel concentrically with respect to the central axis to a chassis of the vehicle.

The foregoing and other aspects will become apparent from the following detailed description of the invention when considered in conjunction with the accompanying drawing figures.

BRIEF DESCRIPTION OF THE DRAWING FIGURES

FIG. 1 is a schematic side elevational view of a track assembly and frame of the vehicle of the invention, with parts removed and with parts in phantom;

FIG. 2 is a plan view, in partial cross-section, showing the features in FIG. 1;

DETAILED DESCRIPTION

Figure 3:
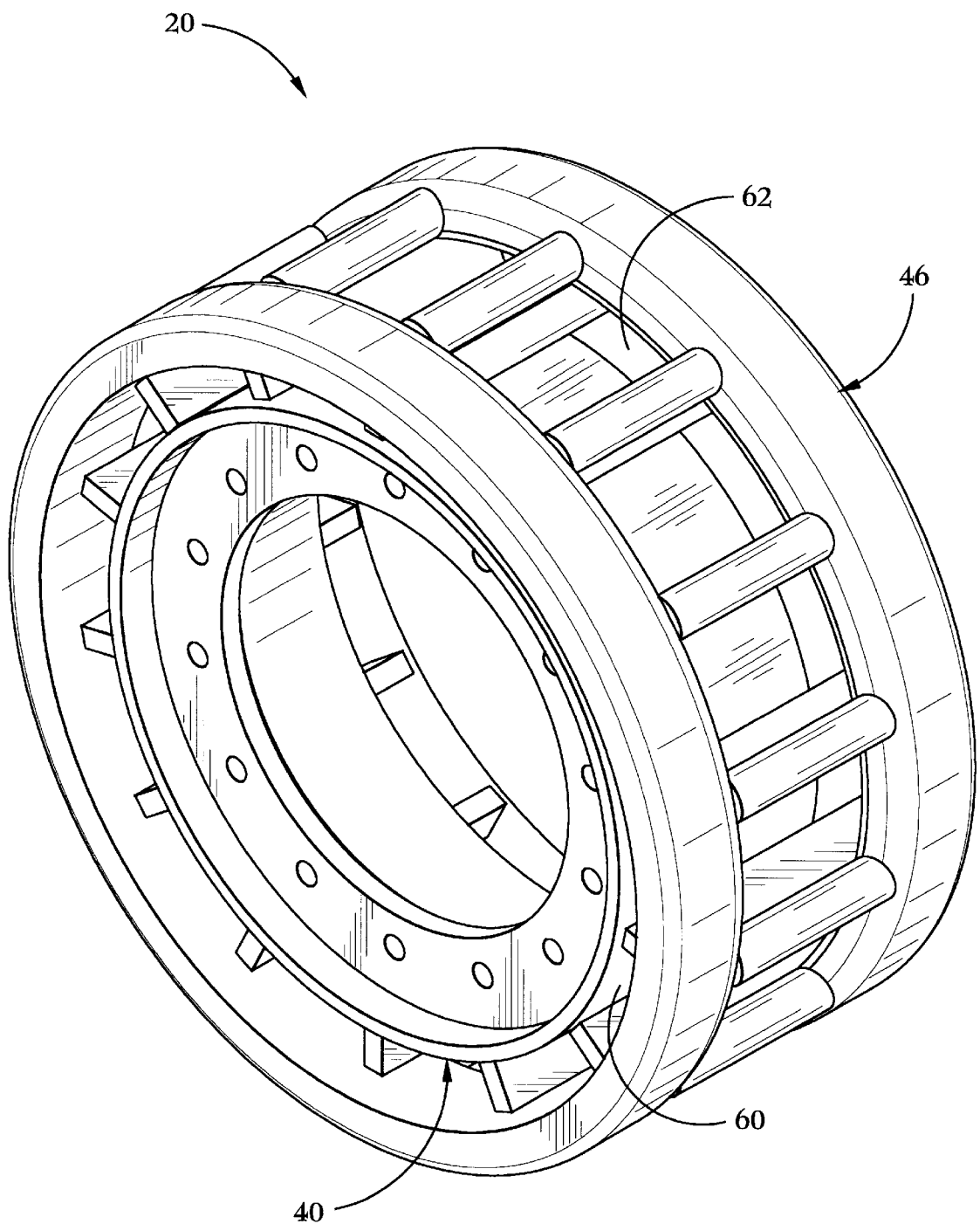
FIG. 3 is a perspective view of the improved drive wheel of the invention.

FIGS. 1 and 2 show a schematic side elevational view of a construction vehicle 1, in this case an asphalt paver. Vehicle 1 includes a conventional chassis 3 with a pair of parallel side frame members 5. Mounted on chassis 3 is a conventional superstructure 9 (shown in phantom) that carries well-known devices, (also represented by the phantom superstructure 9), including: an operator station; steering mechanisms; hydraulic and electrical power circuitry for activating and controlling vehicle functions; a front container for asphalt and a rear spreading auger, with a conveyor therebetween; and a leveling screed trailing behind the chassis 3 and pulled along thereby.

Attached to each side frame member 5 is a pair of parallel first and second track assemblies 11, 13, each being substantially the same, so that a description of one will suffice for both. Each track assembly 11, 13 is connected to side frame member 5 at a front and rear vehicle axle assembly 15, and 17, respectively. Each track assembly 11, 13, has a continuous, toothed, drive belt 19 driven by a drive wheel 20 mounted on a rear axle assembly 17.

Each rear axle assembly 17 comprises hydraulic motor means 22 adjacent a rear end of frame 5, for providing rotary movement to drive wheel 20. A conventional planetary gear reduction means 24 is connected to hydraulic motor means 22, for controlling rotary movement to a preselected gear speed, in this case a two-speed gear reduction, with a single speed reverse.

Figure 8:
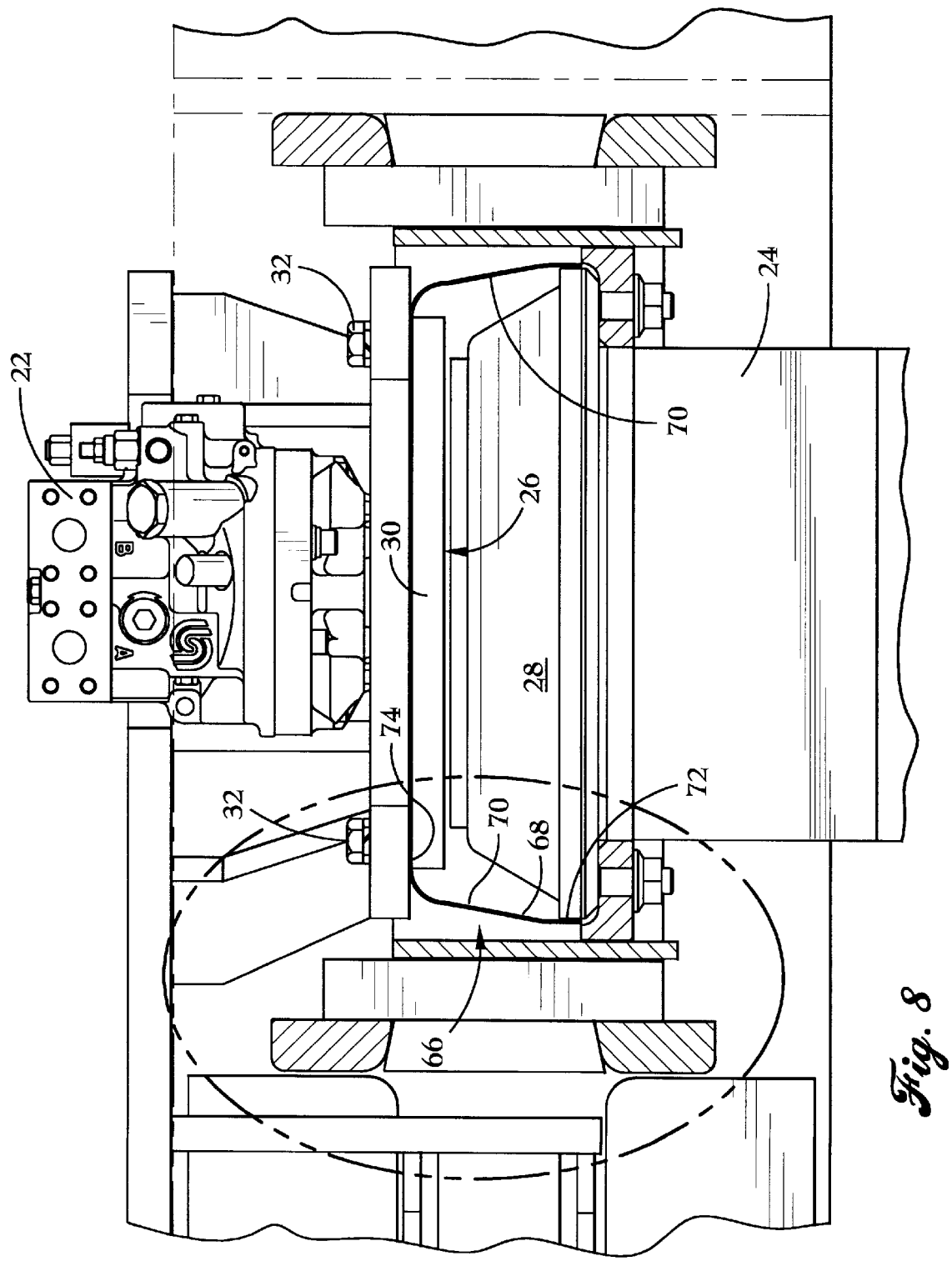
FIG. 8 is an expanded view of the structure encircled in FIG. 2.

As shown in FIGS. 2 and 8, hydraulic motor means 22 is connected to planetary gear reduction means 24, to provide a planetary connection joint 26, whereby a first portion 28 of said planetary gear reduction means 24, positioned outwardly toward an outer side of vehicle 1, rotates about a central axis with respect to a second portion 30 of planetary gear reduction means 24 that is positioned inwardly toward the vehicle frame 5. Second, inner portion 30 of planetary gear reduction means 24 is non-rotatably connected to vehicle frame 5 as by bolts 32.

Figure 9:
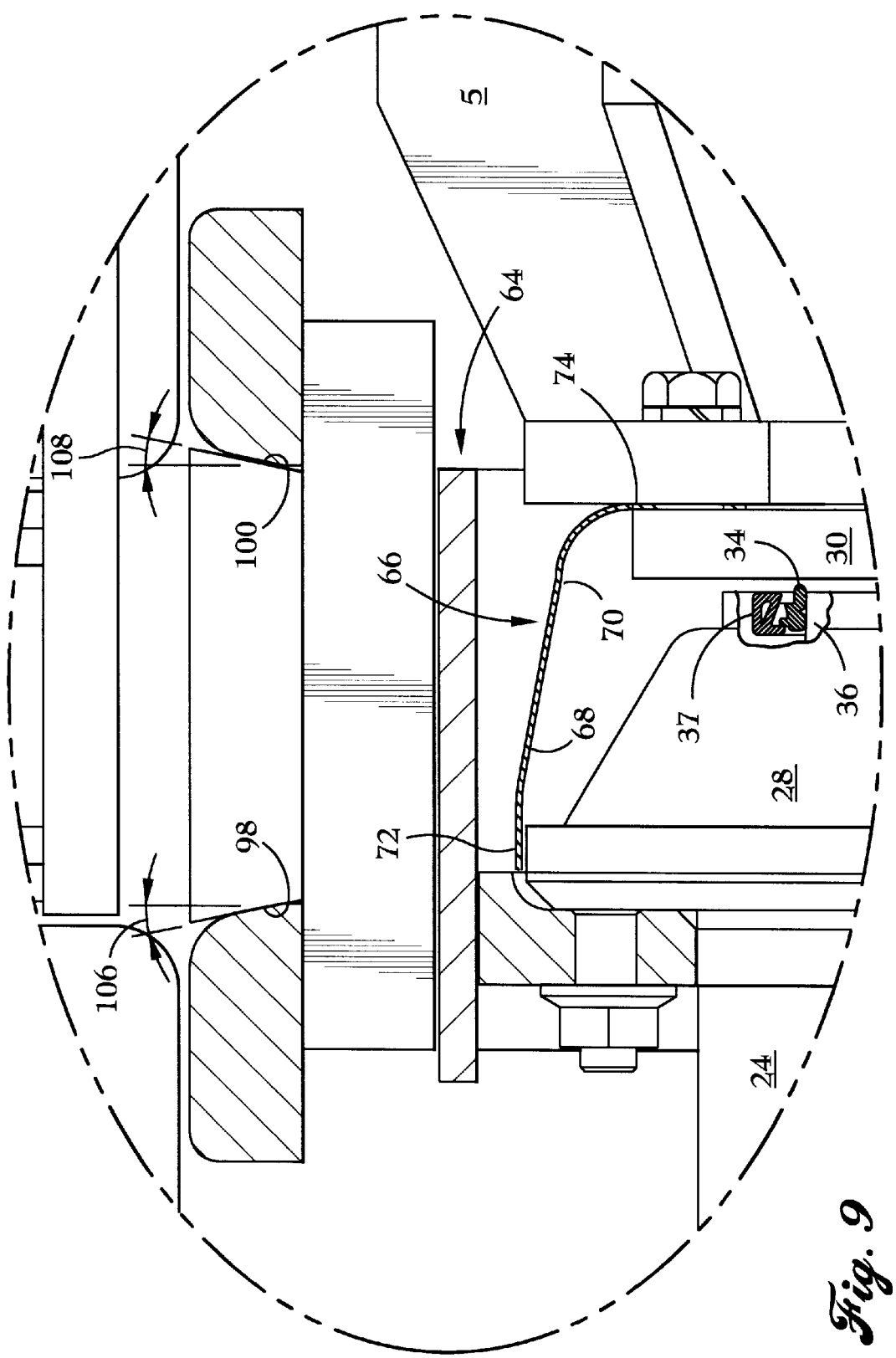
FIG. 9 is an expanded view, in partial cross section, of the structure encircled in FIG. 8.
Figure 10:
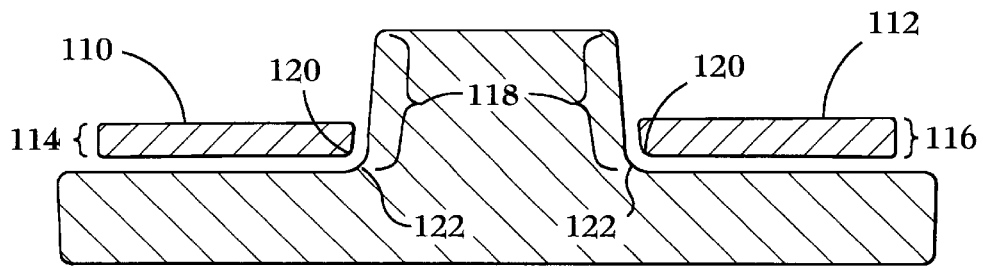
FIG. 10 is a schematic representation of a prior art drive belt and drive wheel assembly.
Figure 11:
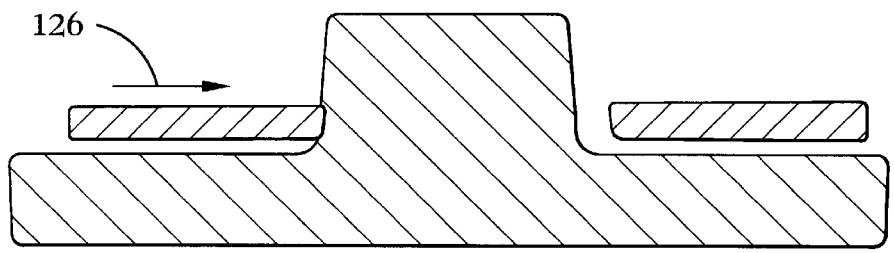
FIGS. 11–13 are similar to FIG. 10, but showing the progression of a prior art wheel climbing up a belt to disengage therefrom.
Figure 12:
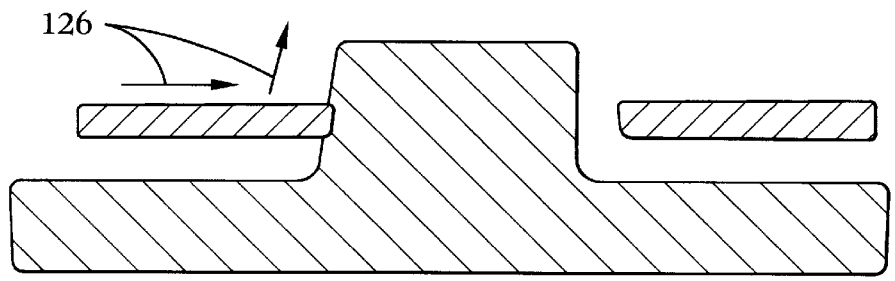
Figure 13:
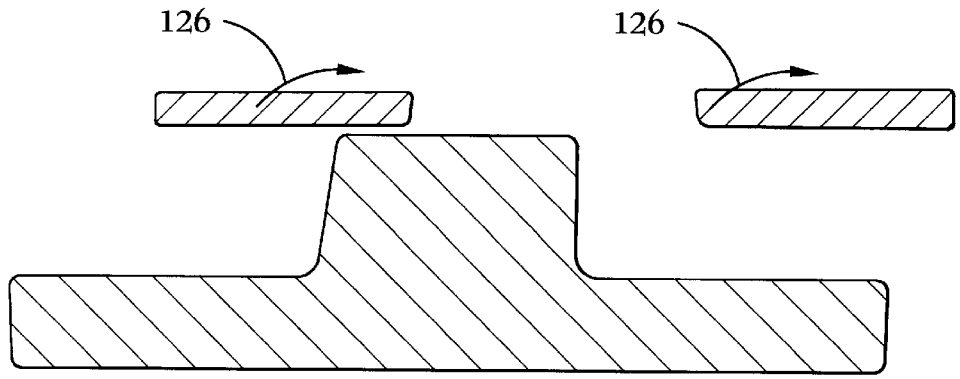

As shown schematically in expanded view of FIG. 9, planetary connection joint 26 includes an annular elastomeric seal 34 surrounding a connecting member 36 between first portion 28 and second portion 30 of planetary gear 24. Seal 34 is held in place by an annular ring member 37, as is well known. Seal 34 retains lubricant fluid in the planetary gear 24.

When debris from drive wheel 20 enters into planetary joint 26, it abrades and damages seal 34, leading to loss of lubricant.

Figure 4:
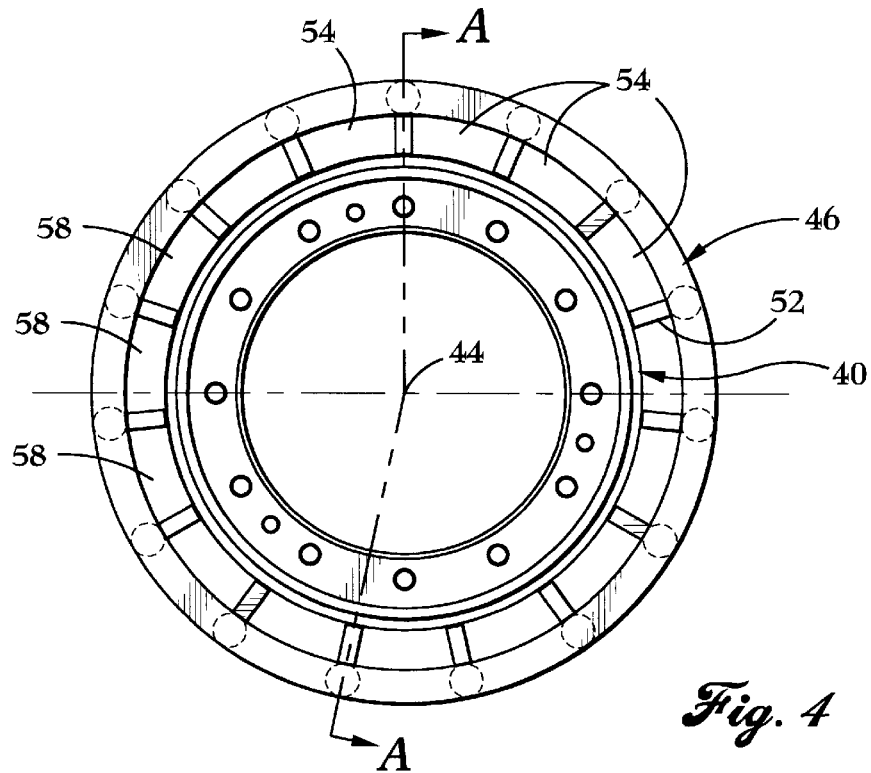
FIG. 4 is a side elevational view of the improved drive wheel of the invention.
Figure 5:
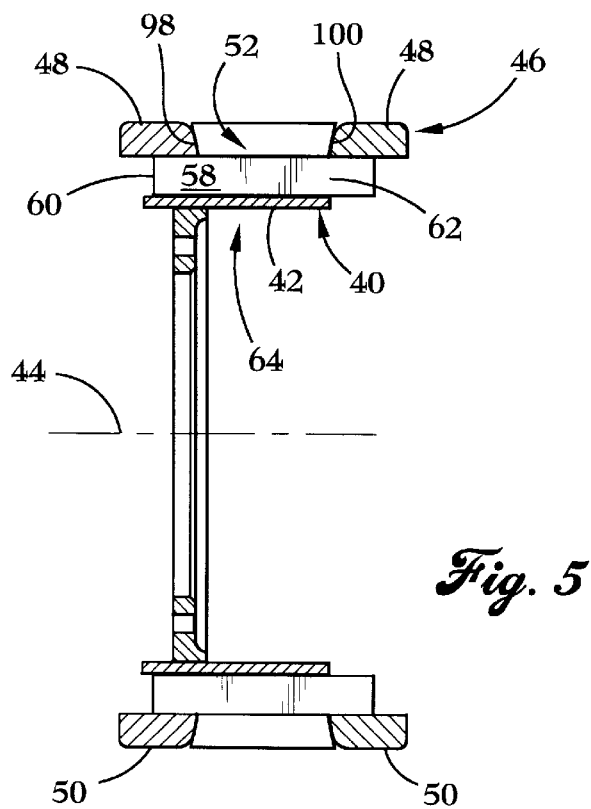
FIG. 5 is view along A—A of FIG. 4.

The improved drive wheel 20 of this invention deflects debris, that may fall from a rotating drive wheel 20, away from planetary joint 26 minimizing damage to seal 34. As shown in FIGS. 3–5, each drive wheel 20 comprises: a first annular ring member 40 having a tubular body 42 circumscribing a central axis 44. A second annular ring member 46 is positioned concentrically with respect to central axis 44 around first annular ring member 40. Second ring member 46 is spaced radially outwardly from first ring member 40, with respect to said central axis 44. Second ring member further comprises a pair of parallel, spaced-apart annular side disc members 48, each side disc member having a circumferential surface 50, oriented radially outwardly with respect to said central axis 44, for contacting a continuous drive belt 19. A plurality of drive wheel lugs 52 extends between side disc members 48, extending parallel to central axis 44. Drive wheel lugs 52 rigidly connect first and second annular ring members 40 and 46. Drive wheel lugs 52 are spaced circumferentially from each other around side discs 48, in this case at equal intervals to provide 15 lugs 52. Adjacent drive wheel lugs 52 form a plurality of sprocket openings 54. Each sprocket opening 54 is adapted for receiving and advancing an individual tooth 56 (FIG. 1) of continuous drive belt 19, when drive wheel 20 rotates in track assembly 11. Thus, first and second annular ring members 40 and 46 are spaced from each other to provide a passage 58 for debris, falling from from a rotating drive wheel 20, to move away from continuous belt 19, via sprocket openings 54 and along first annular ring member 40 to an outer and inner side aperture 60,62 (FIG. 3) where it can deposit freely to a harmless location. Drive wheel 20 can be fastened, concentrically with respect to central axis 44, to rear axle assembly 17.

Drive wheel 20 acts as a first shield means 64 (FIGS. 2 and 4) for planetary connection joint 26 by providing tubular body 42 of first annular ring member 40 with a sufficient length so that tubular body 42 extends along central axis 44 a sufficient distance to overlap planetary connection joint 26. Thus, first shield means 42 is spaced radially outwardly from planetary connection joint 26 with respect to said central axis 44, for deflecting debris from falling into planetary connection joint 26, as drive wheel 20 rotates.

As shown in FIGS. 2,8 and 9, an alternate embodiment of the debris deflecting means of this invention comprises a second shield means 66 spaced radially outwardly from planetary connection joint 26, with respect to central axis 44 and radially inwardly from said first shield means 64, thereby deflecting debris, falling from a rotating drive wheel, away from said planetary connection joint. Second shield means 66 is an annular, cup shaped, disc member 68 connected between hydraulic motor 22 and planetary gear reduction means 24. Disc member 68 comprises a substantially tubular body portion 70 circumscribing central axis 44. Body portion terminates in an outer rim portion 72 and an inner mounting face 74. Outer rim portion 72 overlaps planetary connection joint 26. Inner mounting face 74 is adapted for connection to axle combination 17 as by bolts 32.

The vehicle of this invention further includes belt retention means for preventing teeth 56 from disengaging from lugs 52 and sprockets 54 of drive wheel 20 during a turning maneuver. The drive belt retention means will now be described.

Figure 6:
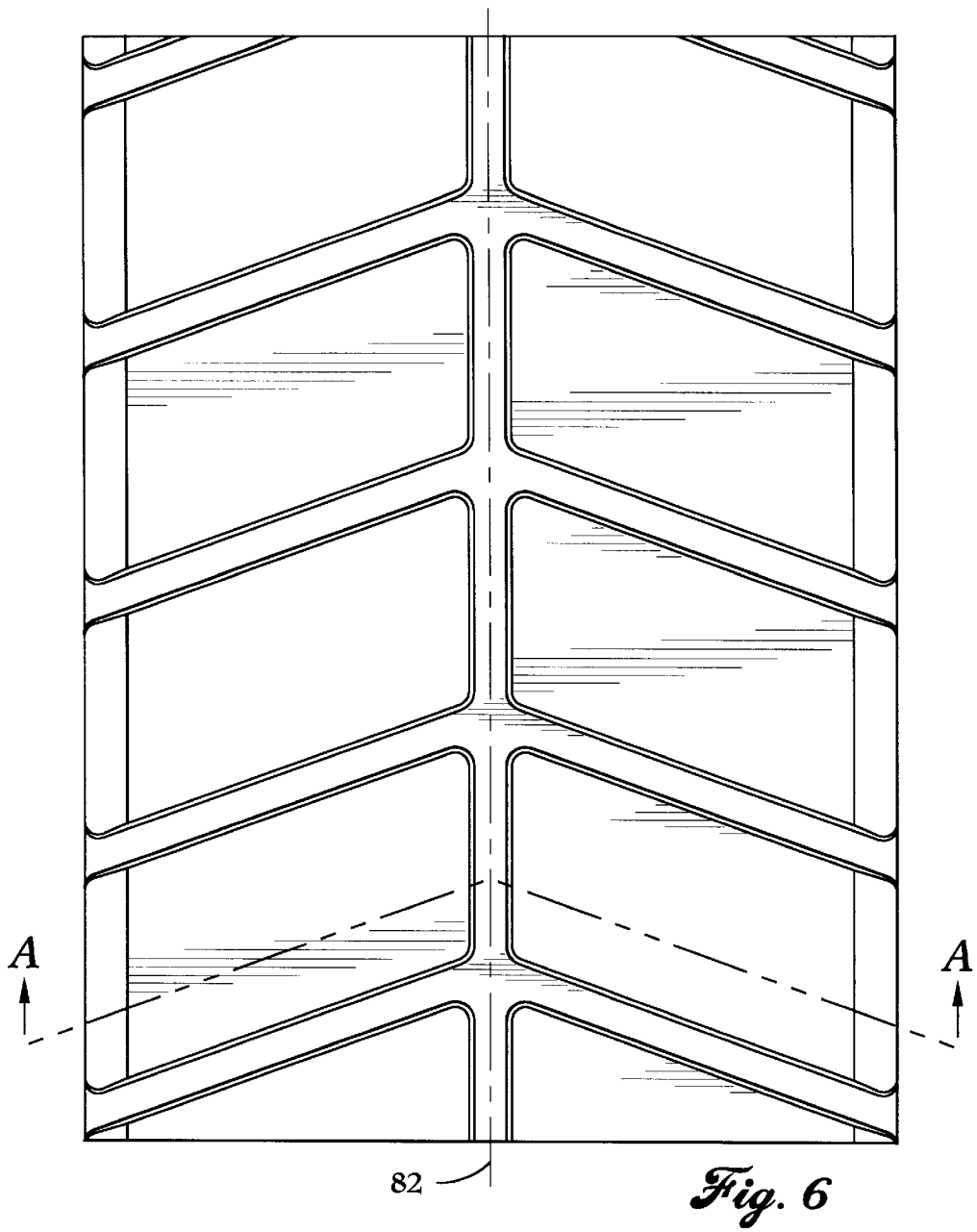
FIG. 6 is a plan view of a portion of the continuous drive belt of the invention.
Figure 7:
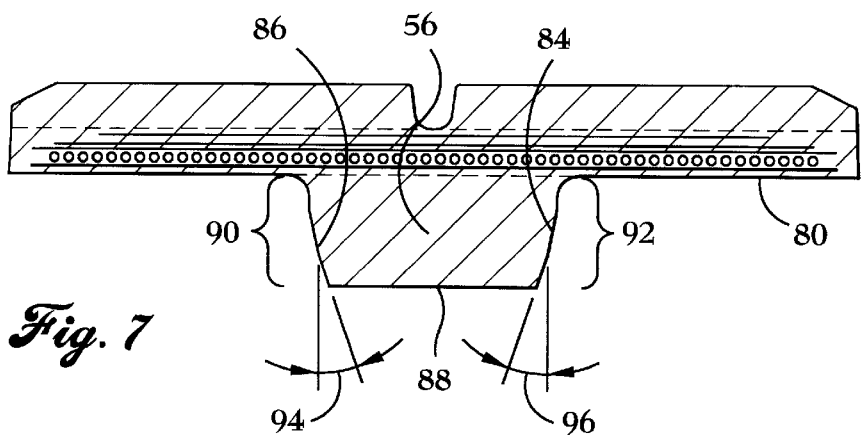
FIG. 7 is a view along A—A of FIG. 6.

Referring to FIGS. 6 and 7, each drive belt tooth 56 extends transversely across a portion of said drive belt width, each tooth 56 extending upwardly from a flat inner surface 80 of drive belt 19. Each tooth 56 is positioned symmetrically across a longitudinal drive belt centerline 82 (FIG. 6), as is conventional. Each tooth 56, when viewed in transverse cross section perpendicular to longitudinal belt centerline 82, has a first and second tooth sidewall 84,86 converging toward each other to form a tooth top surface 88. First and second tooth sidewalls 84, 86 respectively define a first and second sidewall tooth profile 90, 92. Each sidewall tooth profile 90,92 is a substantial mirror image of the other. Each tooth sidewall 84, 86 is slanted from a plane vertical to flat inner belt surface 80 at a first and second tooth sidewall angle 94,96. First and second tooth sidewall angles are substantially equal to each other.

Now referring to FIG. 5, each drive wheel side disc member has, respectively, a first and second annular side disc surface 98, 100 facing each other (FIG. 9). First and second annular side disc surfaces 98, 100, respectively, define a first and second side disc surface profile 102, 104 substantially identical to first and second sidewall tooth profiles 90, 92. Each side disc surface 98, 100 is slanted from a plane vertical to flat inner belt surface 80 at a third and fourth side disc surface angle 106, 108. Third and fourth side disc surface angles 106, 108 are substantially equal to each other and substantially equal to first and second tooth sidewall angles 94,96. We prefer angles 94, 96, 106, 108 to be in the range of 12 degrees (+2, minus 0).

As shown in FIGS. 10–13, a prior the art drive wheel has ring members 110, 112 with side surface profiles 114, 116 that do not match, and did not contact, a drive belt tooth side profile 118 over a substantial portion of the tooth side length. Also, the radius of curvature 120 leading into side disc surface profile 114, 116 is substantially different from the radius of curvature 122 of tooth 56, leading into tooth side profile 90, 92. This non-matching of profiles and curvatures causes the belt 19 to disengage from drive wheel lugs 52 and sprockets 54, during a turning maneuver, as sequentially depicted by arrows 126 in FIGS. 10–13.

Figure 14:
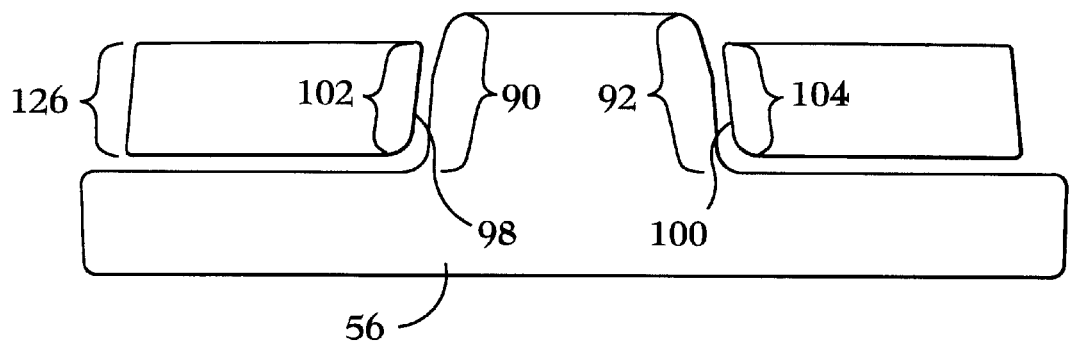
FIG. 14 is schematic transverse cross-section of the wheel of this invention in combination with a drive belt (with parts removed)
Figure 15:
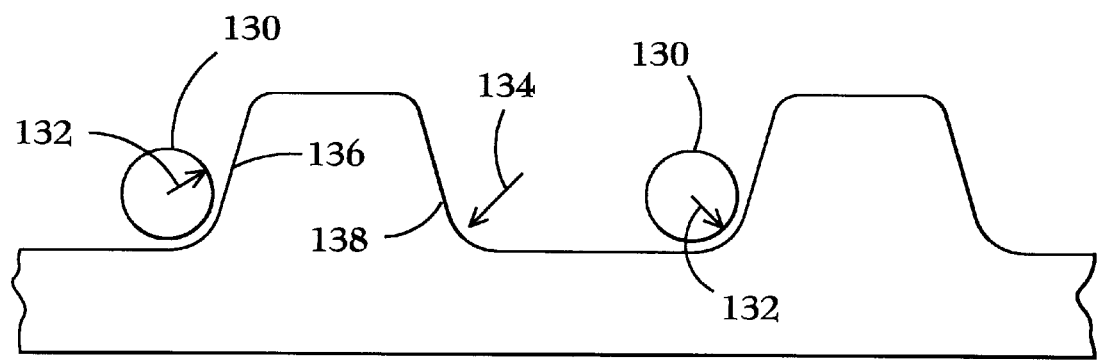
FIG. 15 is a schematic longitudinal cross-section of the wheel of this invention in combination with a drive belt (with parts removed).

As shown in FIGS. 14 and 15, the invention includes profiles 90, 92 of belt tooth 56 being substantially identical to profiles 102, 104 of wheel disc sidewall surfaces 98, 100. Additionally, each wheel disc member is provided with a ring body thickness 126 (measured radially with respect to central axis 44) that approximates the overall height of tooth 56, thereby causing physical contact over substantial portion of the length of each tooth sidewall 84, 86 and each wheel disc sidewall surface 98, 100.

As shown in longitudinal cross section in FIG. 6, each drive lug 52 is provided with an outer surface 130 that has a radius of curvature 132 substantially equal to a radius of curvature 134 of tooth 56 at leading and trailing surfaces 136 and 138 of each tooth 56 as tooth 56 raises up from belt 19.

This substantial matching of lug and tooth profiles, causes superior retention of belt 19 in drive wheel 20.

Having described the invention, what is claimed is:

1. An improved drive wheel for a mobile construction vehicle utilizing track assemblies and continuous toothed drive belts comprising:

(a) a first annular ring member having a tubular body circumscribing a central axis;

(b) a second annular ring member positioned concentrically with respect to said central axis around said first annular ring member, said second ring member spaced radially outwardly from said first ring member with respect to said central axis, said second ring member comprising:
- (1) a pair of parallel, spaced-apart annular side disc members, each side disc member having an outwardly oriented circumferential surface for contacting a continuous drive belt;
- (2) a plurality of drive wheel lugs extending between said side disc members, said wheel drive lugs extending parallel to said central axis, said drive wheel lugs rigidly connecting said first and second annular ring members, said drive wheel lugs spaced circumferentially from each other around said side discs, said drive wheel lugs forming a plurality of sprocket openings, each sprocket opening adapted for receiving and advancing an individual tooth of a continuous drive belt, when said drive wheel rotates in a track assembly;

(c) said first and second annular ring members being spaced from each other to provide a passage for debris falling from a rotating drive wheel to move away from said continuous belt, via said sprocket openings and along said first annular ring member; and (d) means for fastening said drive wheel concentrically with respect to said central axis to a chassis of said vehicle.

2. The improved wheel of claim 1 wherein said first annular ring member tubular body extends along said central axis a sufficient distance such that, when fastened to a rear axle combination, said tubular body member overlaps a sufficient portion of said axle combination therebeneath, to provide a shield means spaced radially outwardly from said axle combination, with respect to said central axis, for deflecting debris from falling into any rotatable portion of said axle combination, when said drive wheel rotates.

* * * * *